United States Patent
Hau et al.

(10) Patent No.: US 7,735,638 B2
(45) Date of Patent: Jun. 15, 2010

(54) CONVEYOR FRAME ASSEMBLY HAVING SIDE RAILS INCLUDING MULTIPLE ATTACHMENT SLOTS AND ADJUSTABLE CROSS SUPPORTS

(75) Inventors: Paul Hau, Watertown, WI (US); Leroy Hundley, Waukesha, WI (US); Craig Bude, Waukesha, WI (US); Michael Hosch, Oconomowoc, WI (US); Ryan Johnson, Eagle, WI (US)

(73) Assignee: Dorner Mfg. Corp., Hartland, WI (US)

( * ) Notice: Subject to any disclaimer, the term of this patent is extended or adjusted under 35 U.S.C. 154(b) by 73 days.

(21) Appl. No.: 12/039,888

(22) Filed: Feb. 29, 2008

(65) Prior Publication Data

US 2008/0210529 A1    Sep. 4, 2008

Related U.S. Application Data

(60) Provisional application No. 60/892,636, filed on Mar. 2, 2007.

(51) Int. Cl.
    *B65G 21/08*    (2006.01)
(52) U.S. Cl. .................................. 198/860.1; 198/861.1
(58) Field of Classification Search .............. 198/860.1, 198/861.1
    See application file for complete search history.

(56) References Cited

U.S. PATENT DOCUMENTS

| 3,835,108 A | * | 9/1974 | Immer et al. ................. 530/313 |
| 4,930,623 A | | 6/1990 | Johnson et al. |
| 5,421,451 A | * | 6/1995 | Easton ..................... 198/860.1 |
| 5,562,202 A | * | 10/1996 | Newcomb et al. ........ 198/861.1 |
| 5,579,695 A | | 12/1996 | Cockayne |
| 6,666,325 B1 | | 12/2003 | Buenning et al. |
| 6,889,824 B2 | * | 5/2005 | Leisner et al. ........... 198/860.1 |

FOREIGN PATENT DOCUMENTS

EP    0634346    *   1/1995    .............. 198/860.1

* cited by examiner

*Primary Examiner*—James R Bidwell
(74) *Attorney, Agent, or Firm*—Andrus, Sceales, Starke & Sawall, LLP

(57) ABSTRACT

The present disclosure relates to a conveyor frame assembly that includes a pair of spaced side rails joined by one or more cross supports. Each of the side rails includes a dedicated wire channel and self-contained air flow cavity that enhances the functionality of the conveyor frame assembly. The air flow cavity and the wire channel are formed as part of the side rails separate from typical attachment slots that receive T-shaped connectors. The cross supports utilized with the conveyor frame assembly are attached to the side rails by upper and lower connectors that are each accessible from the top of the conveyor frame assembly. Specifically, the cross support includes a center web and laterally offset attachment webs that allow for easy and convenient construction and field modification of the conveyor frame assembly.

21 Claims, 9 Drawing Sheets

CONVEYOR FRAME ASSEMBLY HAVING SIDE RAILS INCLUDING MULTIPLE ATTACHMENT SLOTS AND ADJUSTABLE CROSS SUPPORTS

CROSS REFERENCE TO RELATED APPLICATION(S)

The present application is based on and claims priority to U.S. Provisional Patent Application Ser. No. 60/892,636 filed on Mar. 2, 2007.

BACKGROUND OF THE INVENTION

The present invention generally relates to modular conveyor frame assemblies. More specifically, the present invention relates to a conveyor frame assembly that includes configurable cross supports and side rails having multiple passageways and connector slots formed in the side rails.

Presently, moving belt conveyor systems are utilized in vastly different applications to move products/materials from one location to another in an automated fashion. Since conveyor assemblies are used in vastly different applications, the conveyor assemblies oftentimes include auxiliary devices that function in connection with the conveyor assembly to aid in moving products in a desired fashion. As an example, photo detector eyes and pusher devices are oftentimes mounted to the side rails of the conveyor frame assembly to act on the articles being moved by the conveyor frame. When these types of auxiliary devices are utilized with the conveyor frame assembly, the air hoses and electrical wires leading to the auxiliary devices are typically attached to the conveyor frame in a somewhat haphazard manner. Although the conveyor frame side rails may include attachment slots that receive T-shaped connectors to support the auxiliary devices, the T-shaped connectors interrupt the attachment slots, which prevents wires from being received within the attachment slots.

Further, when pushing devices that operate upon pressurized air are utilized, an air pressure hose is typically hung from the side rail of the conveyor frame. The attachment of the electrical wires and the air supply hose to the side rails of the conveyor frame creates a cluttered appearance near the conveyor and may result in inadvertent disconnection of either the electrical wires or the air supply hose by personnel working near the conveyor frame assembly.

Further, in many applications, the user of the conveyor assembly desires to change the length of the conveyor frame based upon the current application. Typically, the length of the conveyor assembly is adjusted by removing portions of the side rail and shortening the conveyor belt. During this process, the cross supports that provide rigidity to the conveyor frame are typically moved and reinstalled at the desired location along the modified length of the conveyor frame. In many conveyor frame assemblies, the reattachment of the cross support requires personnel to add holes to the conveyor side frame, which is oftentimes not practical in the operating environment.

Therefore, a need exists for a conveyor frame assembly that includes side rails that provide a better method of directing both electrical wiring and an air supply hose, while allowing the conveyor length to be modified without requiring holes to be added to the conveyor side rails.

SUMMARY OF THE INVENTION

The present invention relates to a conveyor frame assembly that can be assembled without any modification to the side rails of the conveyor frame assembly. The conveyor frame assembly includes a pair of spaced side rails and cross supports that receive self-threading fasteners in self-tapping slots along the interior side of the side rails. The geometry of the self-tapping slots and the actual side rail are designed to provide added strength to the joint between the cross supports and the side rails. Preferably, the self-tapping slots formed in the side rails are positioned at a 30° angle to drive the cross member into the support shoulder on the side rail extrusion, although angles between 30°-60° are contemplated as being within the scope of the present invention. All of the self-threading fasteners are inserted from above the cross support extrusion to aid in the speed of assembly. The physical configuration of the cross support allows all of the self-threading fasteners used to attach the cross support to the side rail to be visible and accessible from above the conveyor assembly, which provides improved access for assembly and disassembly.

In addition to the method of attaching the cross support to the side rails, each of the side rails includes at least one integrated "light duty" self-tapping auxiliary slot. Each side rail features at least one of light duty auxiliary slots, which can be used for supporting or landing of electrical wires or other auxiliary devices. Self-threading fasteners are inserted into the auxiliary slot on the side rails, which eliminates the need for a T-nut, thus reducing cost and reducing the time it takes to land electrical wires along the entire conveyor.

In accordance with the present invention, each side rail extrusion contains an air flow cavity that can be configured to receive a supply of pressurized air. The end of each extrusion will be blocked, providing a continuous air line for customer access. When multiple section conveyors are used, a connection device is used to bridge the pressurized air from one module to the next. Preferably, the side rail has a location groove along the outside of the side rail to provide a location to access the integrated air flow cavity. To access the air flow cavity, a simple drill and tap can be preformed anywhere along the rail at the location groove and a pneumatic fitting can be installed.

In addition to the integrated air line, the side rail extrusion contains an open wire channel that will accommodate several low voltage wire lines. The wire channel is a continuous, uninterrupted partially enclosed channel that provides support and protection for low voltage wires running from their electronic device to the main junction box or control enclosure. The wire channel has a close fitting cover to seal off the wire channel. This cover can be cut to allow wires to enter and exit the wire channel.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
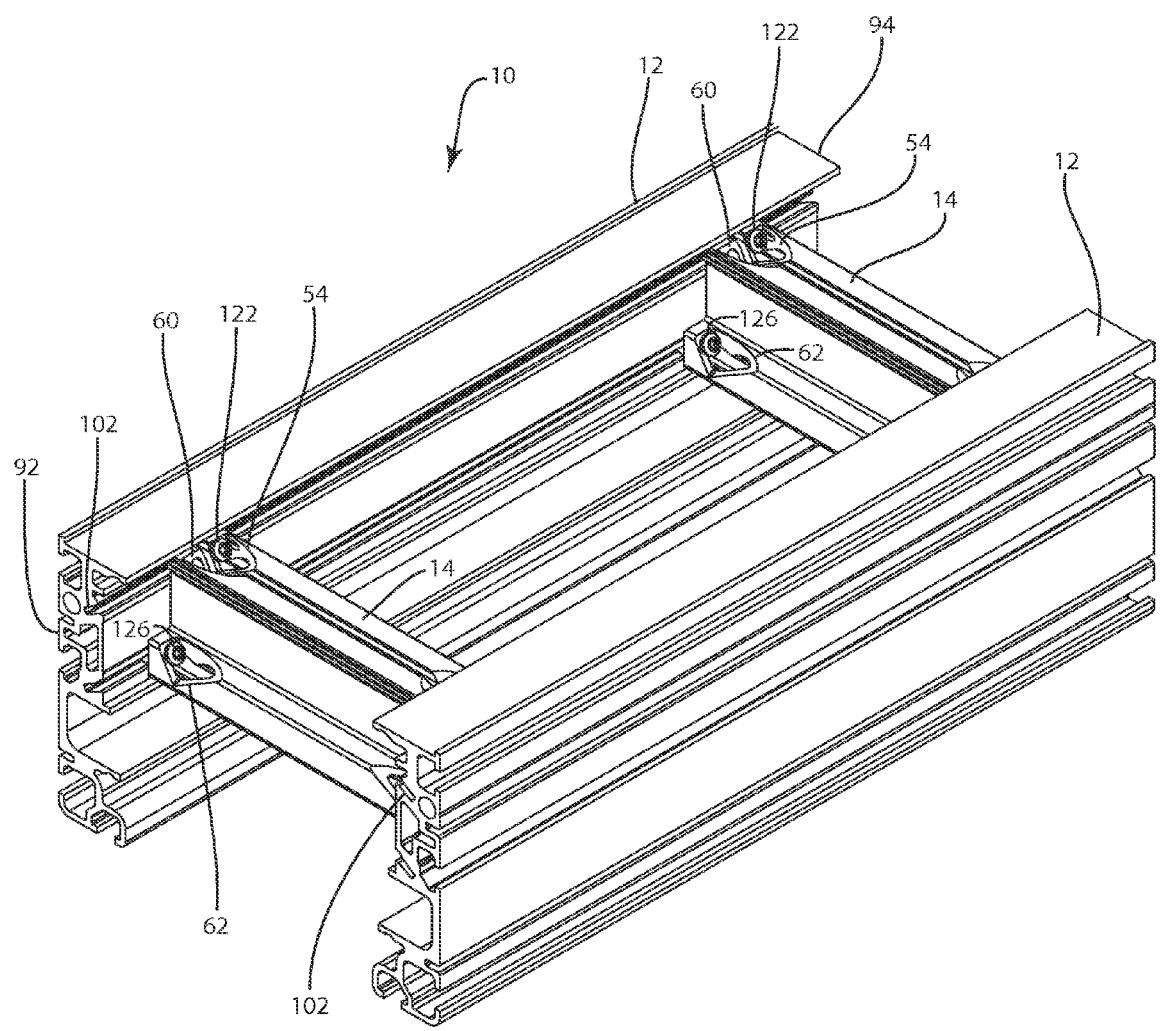
FIG. 1 is a perspective view illustrating a conveyor frame assembly constructed in accordance with the present invention.

FIG. 1 illustrates a conveyor frame assembly 10 constructed in accordance with the present invention. The conveyor frame assembly 10 generally includes a pair of side rails 12 spaced from each other by the width of the conveyor belt (not shown) to be utilized with the conveyor frame assembly. The pair of side rails 12 are supported in a spaced relationship by the pair of cross supports 14 illustrated in FIG. 1. Although the conveyor frame assembly 10 shown in FIG. 1 includes only a pair of cross supports 14, it should be understood that additional cross supports 14 could be utilized in conveyor frame assemblies having a significantly greater length and/or width. The cross supports 14 provide structural integrity for the conveyor frame assembly 10 and additional cross supports 14 may be needed for longer lengths of the conveyor frame assembly.

In the embodiment of the invention illustrated in FIG. 1, both the side rails 12 and the cross supports 14 are formed from extruded aluminum, although other materials are contemplated as being within the scope of the present disclosure.

Figure 6:
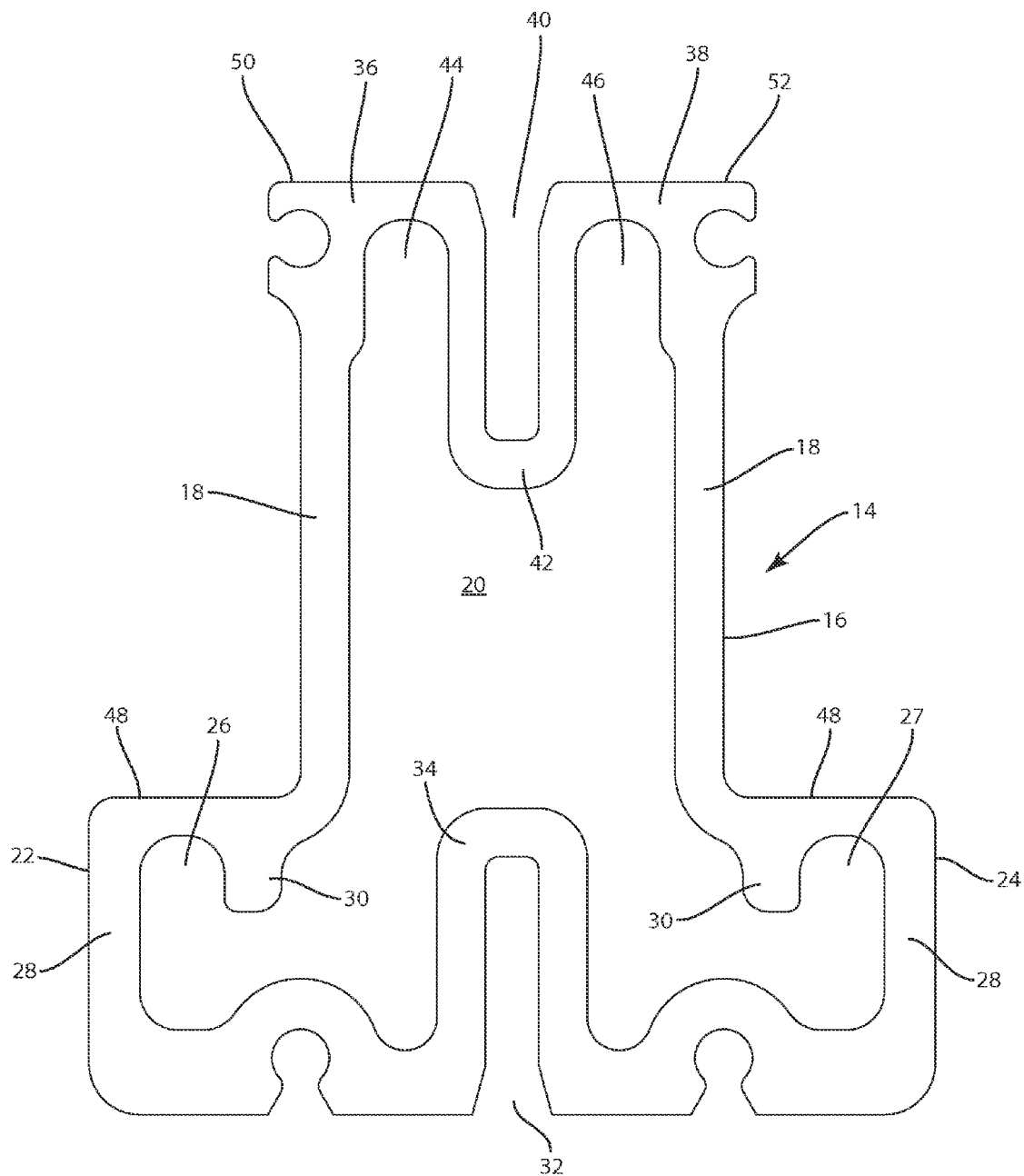
FIG. 6 is an end view of the cross support shown in FIG. 5.

Referring now to FIG. 6, thereshown is an end view of one of the cross supports 14. As illustrated, the cross support 14 includes a center section 16 defined by a pair of outer sidewalls 18. The sidewalls 18 define a generally open interior 20. The cross support 14 includes a pair of lower attachment webs 22, 24. Both of the attachment webs 22, 24 include an internal, lateral attachment slot 26, 27, respectively. Each of the lateral attachment slots 26, 27 is defined by an outer wall 28 and an internal rib 30.

The pair of attachment webs 22, 24 are separated from each other by a central slot 32 defined by the center web 34. The center web 34 extends upward into the open interior 20 to create the slot 32.

The cross support 14 further includes a first upper section 36 and a second upper section 38 that are separated from each other by an upper slot 40. The upper slot 40 is defined by the center web 42 that also extends into the open interior 20. The first upper section 36 includes a central attachment slot 44 while the second upper section 38 includes a similar central attachment slot 46.

As illustrated in FIG. 6, the lateral attachment slots 26, 27 are laterally offset a similar distance from the center line of the cross support 14. Each of the lateral attachment slots 26, 27 is positioned slightly below a generally flat face surface 48. The face surface 48 formed on each of the attachment webs 22, 24 extends laterally from one of the spaced sidewalls 18 of the center section 16. The central attachment slot 44 is also formed slightly below the top face surface 50 while the central attachment slot 46 is formed slightly below the top face surface 52.

Figure 5:
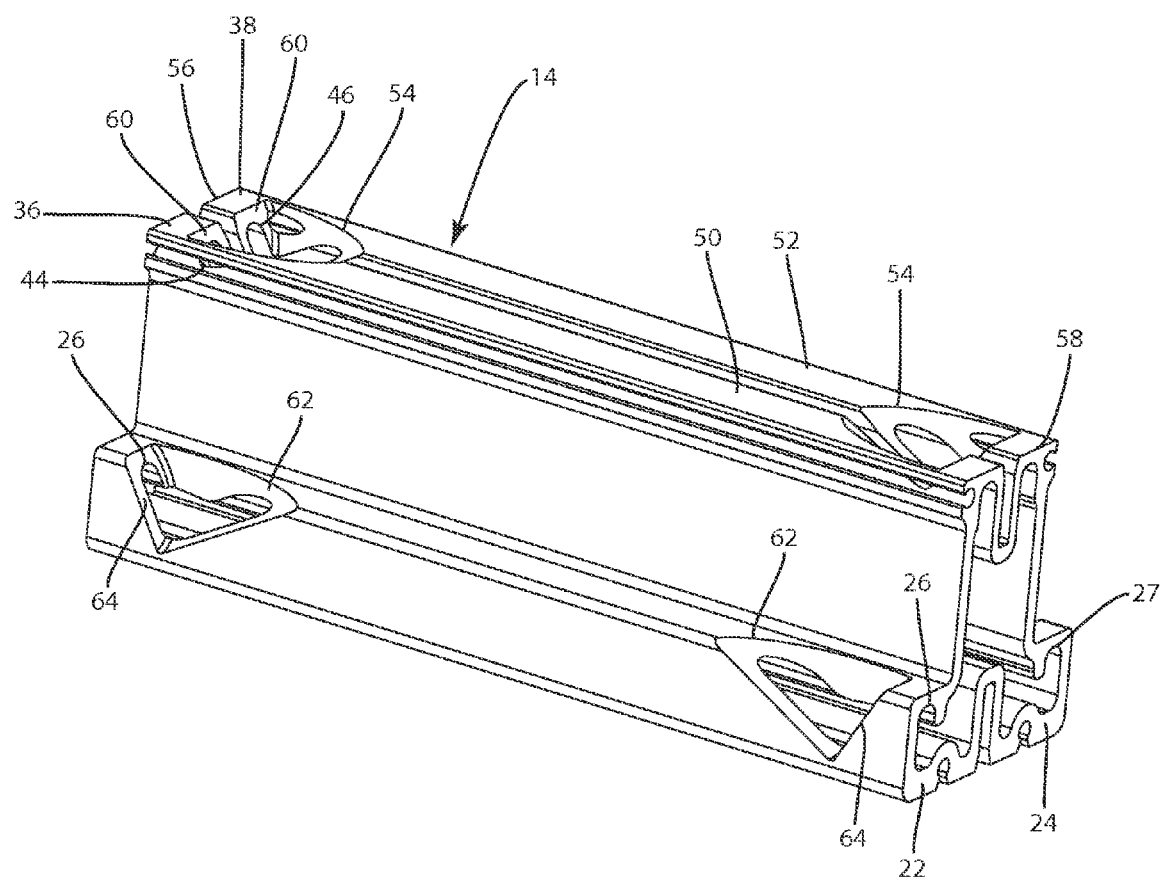
FIG. 5 is a perspective view of the cross support machined for use with a plurality of self-tapping fasteners.

Referring now to FIG. 5, thereshown is the cross support 14 machined for use between the side rails of the conveyor frame assembly. The cross support 14 includes a relieved access area 54 formed near both of the first and second ends 56, 58 of the cross support 14. Specifically, each of the relieved access areas 54 is formed by removing a portion of the top face surface 50, 52 using a circular milling cutter. The relieved access areas 54 create a pair of attachment face surfaces 60, each in one of the upper sections 36, 38. In the embodiment shown in FIG. 5, the attachment face surfaces 60 are formed at an angle relative to vertical. In the embodiment of FIG. 5, each of the attachment face surfaces 60 extends at an angle of approximately 30° relative to vertical. The attachment face surface 60 extends through each of the central attachment slots 44, 46 such that connectors can be used to secure the cross support 14 in the manner to be described in detail below.

In addition to the relieved access areas 54, the cross support 14 is formed with a pair of lower, relieved access areas 62 formed in each of the attachment webs 22 and 24. As shown in FIG. 5, the lower relieved access areas 62 are formed near both the first end 56 and the second end 58 of the cross support 14. The lower relieved access areas 62 are formed by a milling process and create an attachment face surface 64. The attachment face surface 64 is formed at a similar angle relative to vertical as the attachment face surfaces 60. In the preferred embodiment, the attachment face surface 64 extends at the same 30° angle relative to vertical. The lower relieved access area 62 provides access to the lateral attachment slot 26 formed in the attachment web 24. Although not shown in FIG. 5, similar relieved access areas 62 are formed in the attachment web 24 near both the first and second ends 56, 58 to provide similar access to the lateral attachment slot 27.

Figure 7:
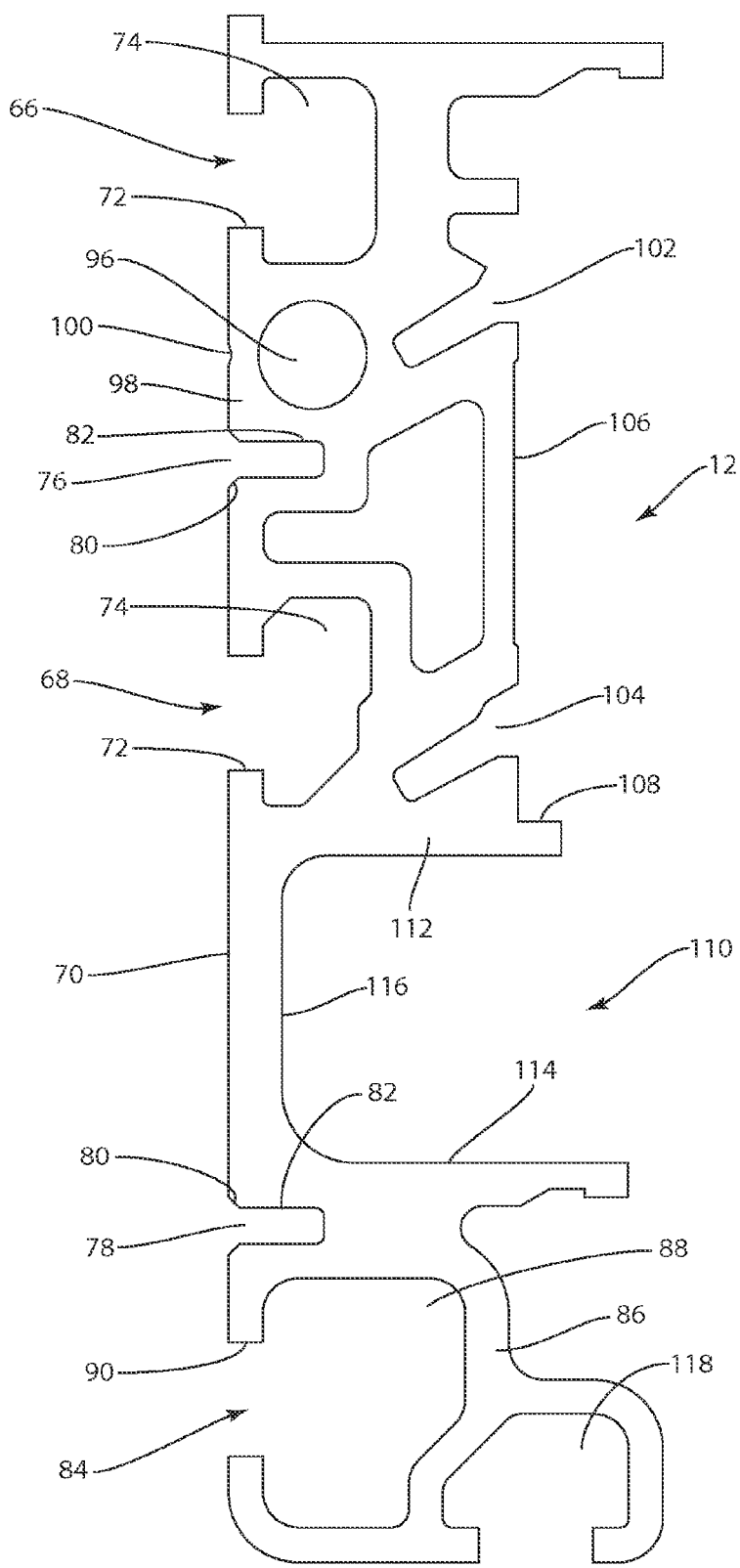
FIG. 7 is an end view illustrating the side rail.

FIG. 7 illustrates an end view of the side rail 12 used in constructing the conveyor frame assembly 10 shown in FIG. 1. The side rail 12 is preferably formed from extruded aluminum. As can be understood in FIG. 1, both of the side rails 12 are formed from the same extrusion. Referring back to FIG. 7, the side rail 12 includes an upper T-slot 66 and a lower T-slot 68 recessed from the outer wall 70. Each of the T-slots 66, 68 include a reduced width entrance opening 72 and a receiving cavity 74. Each of the upper and lower T-slots 66, 68 are sized to receive a T-slot connector to mount various components, such as sensors and pusher devices, along the length of the side rail 12 in a conventional manner.

In addition to the upper and lower T-slots 66, 68, the side rail 12 includes a first self-tapping auxiliary slot 76 and a second self-tapping auxiliary slot 78 that are each sized to receive a self-threading fastener. The auxiliary slots 76, 78 include an expanded outer portion 80 and a constant height channel 82. The self-tapping auxiliary slots 76, 78 can each receive a screw or other similar self-threading connector that allows relatively small devices to be supported on the side rail 12.

The side rail 12 further includes integrated wire channel 84. The wire channel 84 is formed by an outer wall 86 that defines an internal wire cavity 88 having an entrance opening 90. The wire cavity 84 extends, uninterrupted, from a first end 92 to a second end 94 of the side rail 12, as illustrated in FIG. 1. The uninterrupted wire channel 84 allows each of the side rails 12 to support a continuous low voltage wire or wires running from electronic devices mounted to the conveyor frame assembly 10 to a main junction box or control enclosure. The wire channel 84, unlike the upper and lower T-slots 66, 68, is not designed to receive T-slot connectors. Thus, during use of the conveyor assembly, the wire cavity 84 will extend, uninterrupted, along the entire length of each of the side rails 12.

Referring back to FIG. 7, the side rail 12 further includes an air flow cavity 96 that extends, uninterrupted, along the entire length of the side rail 12. The air flow cavity 96 is completely contained within the side rail 12 and extends along the entire length of the side rail. Preferably, the air flow cavity 96 can receive a pressurized supply of air by tapping into the air flow cavity 97 at a location between the first end 92 and the second end 94 of the conveyor frame assembly. Both ends of the side rail receiving the pressurized air typically receive an end cap to prevent the leakage of the pressurized air from within the air flow cavity 96. If a multiple section conveyor is constructed, a connection device (not shown) can be used to bridge the pressurized air from one side rail 12 to a similar side rail of the following conveyor section.

As illustrated in FIG. 7, the outer wall 98 includes a location groove 100 that provides a guide to access the air flow cavity 96 through the outer wall 98. As an example, if a device is attached to the side rail 12 that requires a supply of pressurized air, an air connection can be drilled through the outer wall 98 through the location groove 100.

Referring back to FIG. 7, the interior side of the side rail 12 includes an upper self-tapping slot 102 and a lower self-tapping slot 104 that each extend at an angle (30°) inward from an inner wall 106. The inner wall 106 terminates with a lower support shoulder 108. Positioned below the support shoulder 108 is a lower conveyor belt receiving cavity 110. The conveyor belt receiving cavity 110 is defined by a horizontal top wall 112 and a horizontal bottom wall 114. The top and bottom walls 112, 114 are each joined by a back wall 116. The height of the conveyor belt receiving cavity 110 is defined by the distance between the top and bottom walls 112, 114 and is selected to be greater than the thickness of the conveyor belt.

The side rail 12 further includes a bottom, T-slot 118. The bottom T-slot 118 is formed at the bottom of the side rail 12 and is configured to receive a conventional T-slot connector. Preferably, the bottom T-slot 118 allows the side rail 12 to be mounted to a support stand using conventional connectors.

Figure 2:
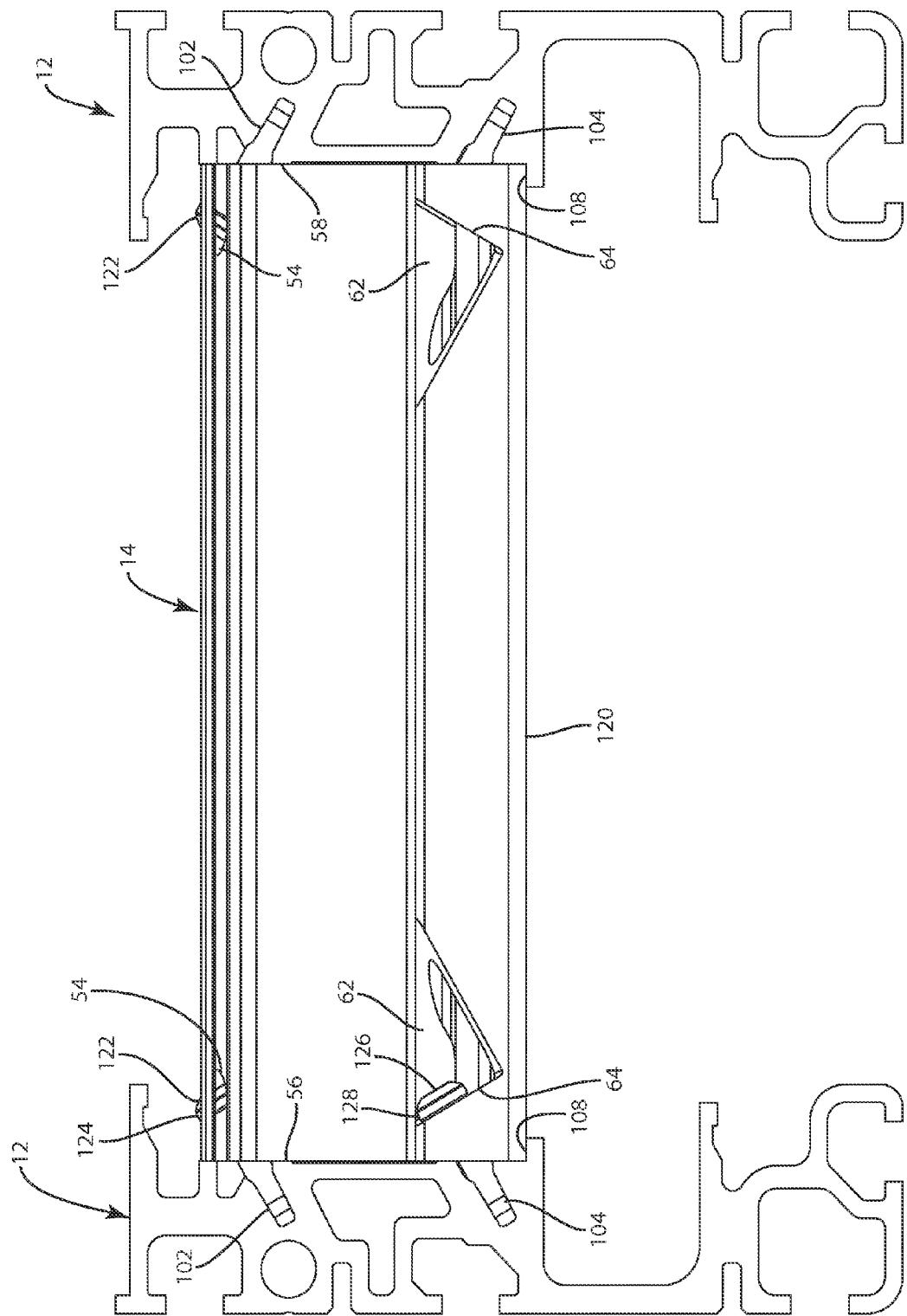
FIG. 2 is an end view of the conveyor frame assembly shown in FIG. 1.

Referring now to FIGS. 1 and 2, the method of assembling the conveyor frame assembly 10 will now be described. Initially, the pair of cross supports 14 are positioned at the desired location along the length of the side rail 12 between the first end 92 and the second end 94. In the embodiment shown in FIG. 1, a pair of cross supports 14 are utilized. However, it should be understood that additional cross supports 14 could be utilized while operating within the scope of the present invention.

Referring now to FIG. 2, when the cross support 14 is positioned between the side rails 12, the bottom edge 120 of the cross support 14 rests upon the support shoulders 108 formed on each of the side rails 12. The support shoulders 108 provide the vertical support necessary to hold the cross support 14 in the position shown in FIG. 2.

Once the cross support 14 has been positioned as shown in FIG. 2, a pair of upper fasteners 122, such as self-threading screws, are used to secure the first end 56 and the second end 58 of the cross support 14 to each of the spaced side rails 12. As shown in FIGS. 1 and 2, each of the upper fasteners 122 are received within the relieved access areas 54 machined into the cross support 14 and are tightened into the upper self-tapping slot 102. The fasteners 122 are tightened until the head 124 of the fastener 122 contacts the attachment face surface 60 formed as part of the relieved area 54, as best shown in FIG. 5.

In addition to the pair of upper fasteners 122, the cross support 14 is attached between the pair of side rails 12 by a pair of lower fasteners 126. In the embodiment shown in FIG. 2, the lower fasteners 126 are also self-threading screws. The self-threading fasteners 126 are each received within the lower self-tapping slots 104 formed in each of the side rails 12 until the head 128 of the self-threading fastener 126 contacts the attachment face surface 64 of the relieved access area 62. In this manner, the upper and lower fasteners 122, 126 secure the cross support 14 between the pair of side rails 12.

Figure 4:
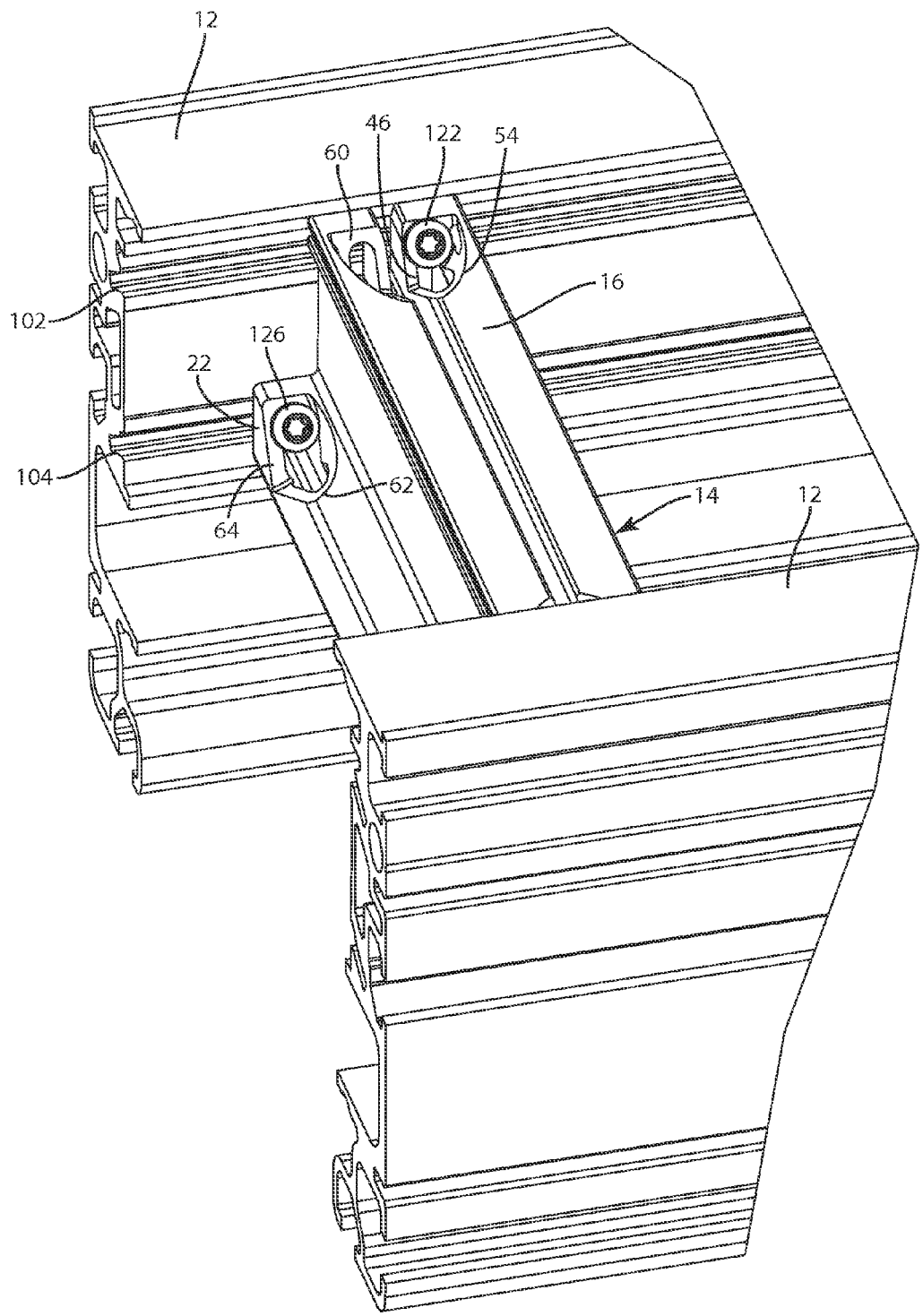
FIG. 4 is a top perspective view illustrating the mounting of a cross support between a pair of spaced side rails.

Referring now to FIG. 4, the configuration of the cross support 14 allows both the upper fasteners 122 and the lower fasteners 126 to be installed between the cross support 14 and the pair of side rails 12 from above the cross support 14. Specifically, the lower fastener 126 is received within the attachment web 22, which is laterally offset from the center section 16. The upper fastener 122 is received within the central attachment slot 46 which is accessible from above the conveyor frame assembly 10, as best illustrated in FIG. 4. Thus, during the initial construction of the conveyor frame assembly 10, each of the cross supports 14 can be secured to the pair of spaced side rails 12 from above the conveyor frame assembly. Further, the lateral offset of the attachment web 22 allows both the upper and lower fasteners 122, 126 to be visible and therefore accessible by a straight installation tool, such as a screwdriver, at the same time from above the conveyor assembly.

Figure 3:
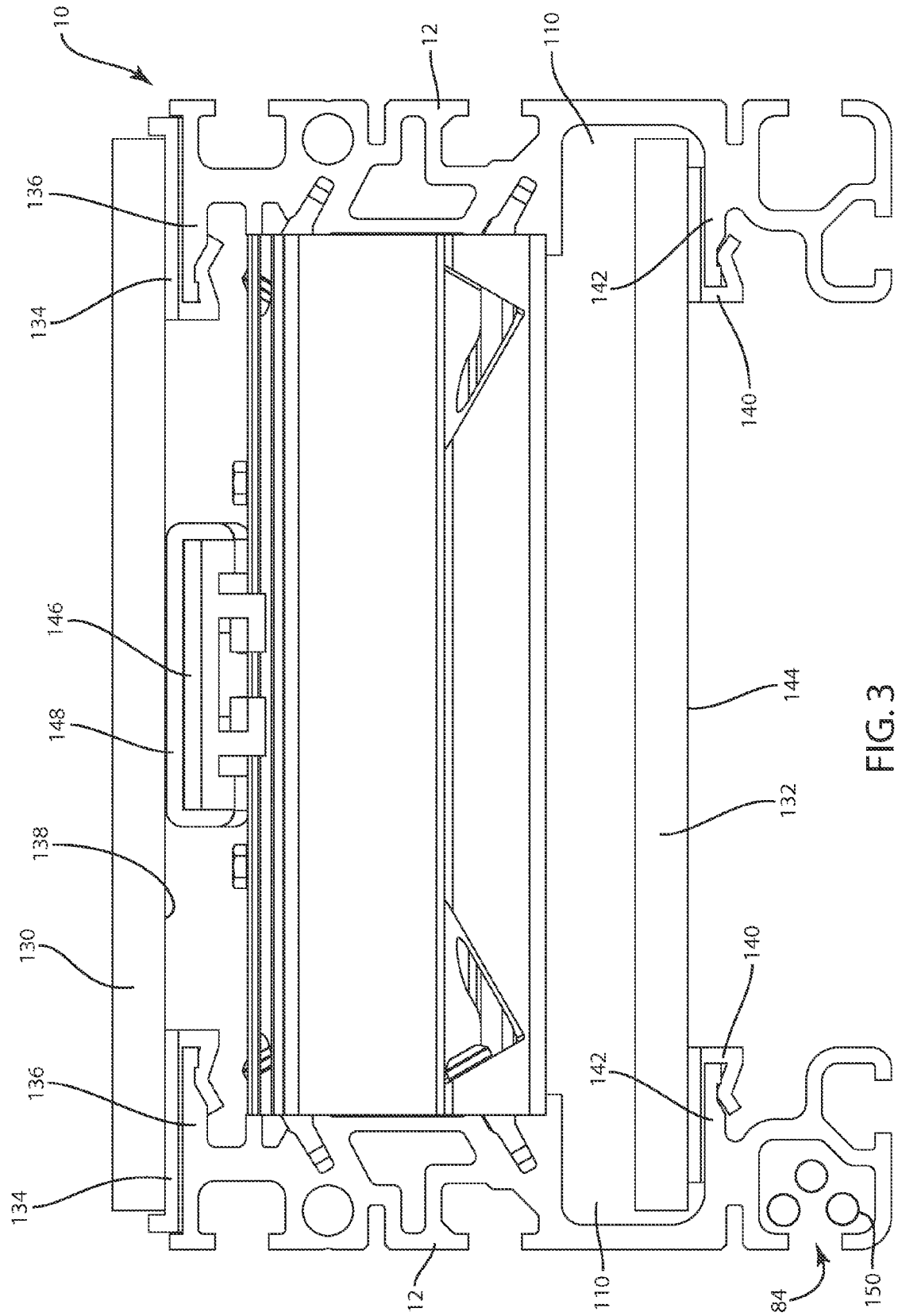
FIG. 3 is an end view, similar to FIG. 2, illustrating the location of the upper and lower runs of a continuous conveyor belt.

Referring now to FIG. 3, thereshown is the entire conveyor assembly 10 constructed and being used with a conveyor belt having an upper run 130 and a lower run 132. In the embodiment illustrated, each of the side rails 12 includes a pair of upper wear clips 134 each attached to the upper wall 136. The wear clips 134 are preferably formed from a durable, wear-resistant material, such as UHMW, that contacts the first surface 138 of the conveyor belt. Likewise, a pair of lower wear clips 140 are attached to the lower attachment flange 142 and contact the second surface 144 of the conveyor belt.

As illustrated in FIG. 3, the lower run 132 of the conveyor belt is received within the conveyor belt receiving cavity 110 to limit the lateral and vertical movement of the conveyor belt during operation. As illustrated, the height of the conveyor belt receiving cavity 110 is greater than the thickness of the lower run 132 such that the conveyor belt can move vertically within the conveyor belt receiving cavity 110.

In the embodiment shown in FIG. 3, a center support 146, having a wear resistant outer guard 148, is mounted between the cross support 14 to provide additional support for the center of the upper run 130 of the conveyor belt. In the embodiment shown in FIG. 3, a series of low voltage wires 150 are received within the wire channel 84 and extend along the entire length of the side frame 12.

Figure 8:
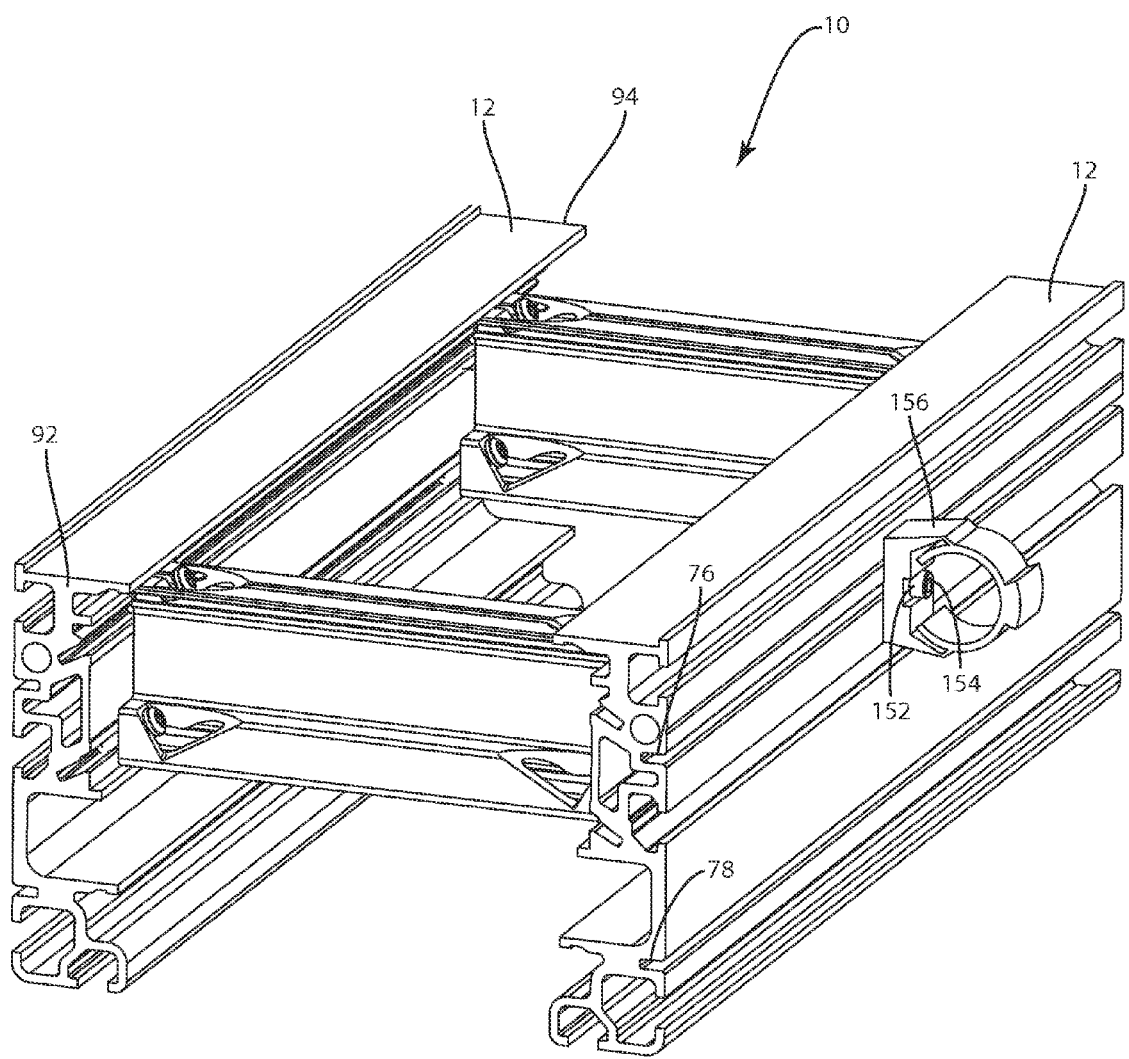
FIG. 8 is a perspective view of the conveyor frame assembly illustrating the attachment of an auxiliary support device mounted to one of the self-tapping auxiliary slots formed in the conveyor frame side rail.
Figure 9:
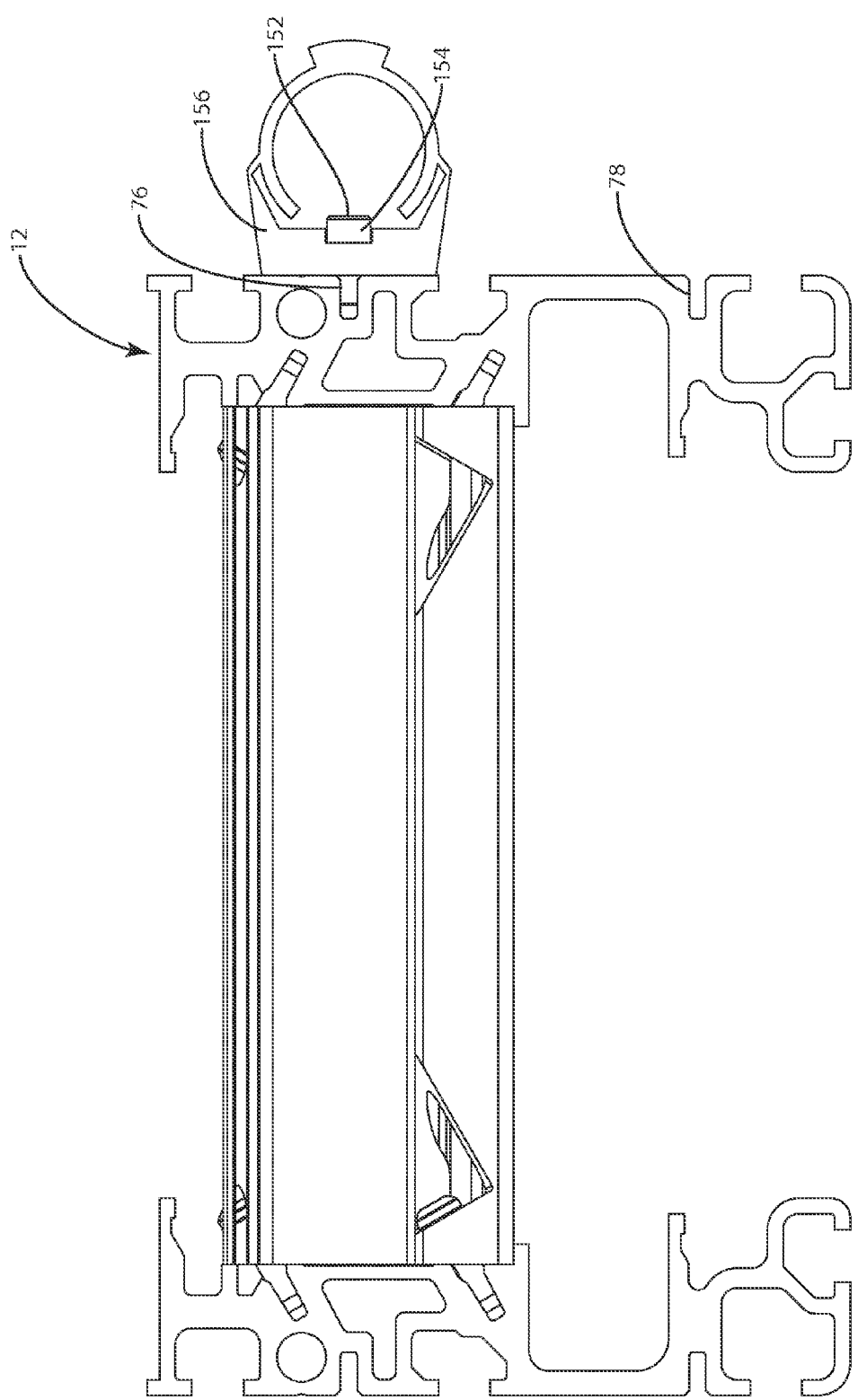
FIG. 9 is an end view of the conveyor frame assembly shown in FIG. 8.

Referring now to FIGS. 8 and 9, each of the side rails 12 includes a pair of self-tapping auxiliary slots 76 and 78. The self-tapping auxiliary slots 76, 78 extend along the entire length of the side rails from the first end 92 to the second end 94. The self-tapping auxiliary slots 76, 78 are each sized to receive a self-threading connector such as shown by reference numeral 152. The self-threading connector 152 includes a head portion 154 and a threaded shaft. As the fastener 152 is turned within one of the self-tapping auxiliary slots 76, 78, the threads contained on the shaft of the fastener 152 creates a series of threads within the side rail 12.

In the embodiment shown in FIG. 8, the fastener 152 secures an auxiliary attachment device 156 to the outer face surface of the side rail 12. The auxiliary attachment device 156 can be selectively positioned anywhere along the length of the side rail between the first end 92 and the second end 94. Once in position, the fastener 152 can be threaded into the self-tapping auxiliary slot 76. In this manner, the attachment device 156 can be selectively positioned at any location along the length of the conveyor frame assembly. It is contemplated that the attachment device 156 may be used for conduit to guide electrical wires, cables or air hoses along the length of the conveyor assembly. Alternatively, various other types of lightweight auxiliary devices can be mounted at any position along the length of the conveyor assembly through the use of the pair of self-tapping slots 76, 78.

Although the side rails 12 are shown with a pair of self-tapping auxiliary slots 76, 78, it is contemplated that either an additional number of slots could be incorporated into the side rails or that a single slot could be formed in the side rails. In either case, the self-tapping auxiliary slots 76, 78 extend along the entire length of the side rails and allow various different auxiliary devices, such as air line supports, wire harnesses, photo sensors or various other lightweight devices to be attached selectively along the length of the conveyor frame.

We claim:

1. A modular conveyor assembly, comprising:
a pair of spaced side rails each extending from a first end to a second end, each of the side rails having an interior side and an exterior side, wherein the interior side includes a pair of continuous self-tapping attachment slots extending from the first end to the second end of the side rail;
a plurality of cross supports each extending from a first end to a second end, the plurality of cross supports being positioned between the pair of side rails, each of the cross supports including at least a pair of continuous attachment slots each extending from the first end to the second end of the cross support; and
at least a pair of self-threading fasteners each extending through one of the attachment slots in the cross support and receivable in one of the self-tapping attachment slots formed in the side rails to secure the cross support between the pair of side rails.

2. The conveyor assembly of claim 1 wherein the pair of self-threading fasteners are each accessible from above the conveyor assembly.

3. The conveyor assembly of claim 1 wherein the cross supports each include a center section and a pair of attachment webs positioned on opposite sides of the center section, wherein each of the attachment webs includes one of the attachment slots and the center section includes at least one of the attachment slots.

4. The conveyor assembly of claim 1 wherein each of the self-tapping attachment slots formed in the side rails extends at an attachment angle relative to an inner surface of the side rails.

5. The conveyor assembly of claim 3 wherein the cross supports each include a relieved upper access area formed in the center section to provide access to the attachment slot formed therein and a relieved lower access area formed in at least one of the attachment webs to provide access to the attachment slot formed therein.

6. The conveyor assembly of claim 5 wherein each of the upper and lower relieved access areas defines an attachment face surface, wherein a head portion of each of the self-threading fasteners contacts the attachment face surface.

7. The conveyor assembly of claim 6 wherein the attachment face surface is perpendicular to the self-tapping attachment slots formed in the pair of spaced side rails.

8. The modular conveyor assembly of claim 1 wherein the exterior side of each of the pair of spaced side rails includes at least one continuous self-tapping auxiliary slot extending from the first end to the second end of the side rail, wherein the self-tapping auxiliary slot selectively receives a self-threading fastener anywhere along the length of the side rail.

9. The conveyor assembly of claim 8 wherein each of the side rails includes a pair of continuous self-tapping auxiliary slots.

10. The conveyor assembly of claim 9 wherein the side rails each include a continuous wire channel extending along the length of the side rail and sized to receive at least one wire.

11. The conveyor assembly of claim 1 wherein the side rails each include a completely enclosed air flow cavity extending from the first end to the second end of the side rail.

12. A modular conveyor assembly, comprising:
a pair of spaced side rails extending from a first end to a second end, wherein each of the side rails includes an interior side and an exterior side, the interior side including a pair of continuous self-tapping attachment slots each extending from the first end to the second end of the side rail, the outer surface including at least one continuous self-tapping auxiliary slot extending from the first end to the second end of the side rail;
a plurality of cross supports extending between the pair of side rails, each of the cross supports including at least a pair of attachment slots; and
at least a pair of self-threading fasteners each extending through one of the attachment slots formed in the cross support and receivable in one of the self-tapping attachment slots formed in the side rail to secure the cross support to the pair of side rails.

13. The conveyor assembly of claim 12 wherein the pair of self-threading fasteners are each accessible from above the conveyor assembly.

14. The conveyor assembly of claim 12 wherein the cross supports each include a center section and a pair of attachment webs positioned on opposite sides of the center section, wherein each of the attachment webs includes one of the attachment slots and the center section includes at least one of the attachment slots.

15. The conveyor assembly of claim 12 wherein each of the self-tapping attachment slots formed in the side rails extend at an attachment angle relative to an inner surface of the side rails.

16. The conveyor assembly of claim 14 wherein the cross supports each include a relieved upper access area formed in the center section to provide access to the attachment slot formed therein and a relieved lower access area formed in at least one of the attachment webs to provide access to the attachment slot formed therein.

17. The conveyor assembly of claim 16 wherein each of the upper and lower relieved access areas defines an attachment face surface, wherein a head portion of each of the self-threading fasteners contacts the attachment face surface.

18. The conveyor assembly of claim 12 wherein each of the side rails includes a pair of continuous self-tapping auxiliary slots.

19. The conveyor assembly of claim 12 wherein the side rails each include a continuous wire channel extending along the length of the side rail and sized to receive at least one wire.

20. The conveyor assembly of claim 12 wherein the side rails each include a completely enclosed air flow cavity extending from the first end to the second end of the side rail.

21. The conveyor assembly of claim 12 wherein the location of the cross supports along the length of the side rails can be selectively adjusted by removing the self-tapping fasteners and repositioning the cross supports, wherein the cross supports can be re-secured to the side rails at the selected location without modification to the side rails.

* * * * *